United States Patent
Schoenow

(10) Patent No.: US 7,922,231 B2
(45) Date of Patent: Apr. 12, 2011

(54) FUEL DOOR LOCKING SYSTEM

(75) Inventor: James K. Schoenow, Frankenmuth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 12/427,110

(22) Filed: Apr. 21, 2009

(65) Prior Publication Data

US 2010/0263417 A1   Oct. 21, 2010

(51) Int. Cl.
*B60K 15/05* (2006.01)

(52) U.S. Cl. .................................................. 296/97.22
(58) Field of Classification Search ............... 296/97.22
See application file for complete search history.

(56) References Cited

U.S. PATENT DOCUMENTS

| | | | | |
|---|---|---|---|---|
| 5,165,749 A | * | 11/1992 | Sheppard | 296/97.22 |
| 6,106,049 A | * | 8/2000 | Cole et al. | 296/97.22 |
| 7,380,861 B2 | * | 6/2008 | Engel | 296/97.22 |
| 7,740,301 B2 | * | 6/2010 | Hirano | 296/97.22 |
| 2010/0019429 A1 | * | 1/2010 | Simon | 269/214 |

OTHER PUBLICATIONS

Key-Rex (TM) locking system product sheet (3 pgs.) of Bryce Fastener Mfg., Inc. of Gilbert, AZ from website: http://www.brycefastner.com/keyrex.htm. Dated 2006.

* cited by examiner

*Primary Examiner* — Dennis H Pedder

(57) ABSTRACT

A fuel door locking system for a fuel door and hinge arm combination in which the fuel door is slidably interfaced on the hinge arm. The fuel door has a pin aperture. An abutment of the hinge arm is disposed adjacent said pin aperture. A locking pin is adapted for being inserted into the pin aperture with an interfering relationship with respect thereto which impedes the locking pin from being removed from the pin aperture. When the fuel door is slidably interfaced on the hinge arm and the locking pin is inserted into the pin aperture, then the abutment interferingly abuts the locking pin to prevent the fuel door from being slid off from the hinge arm.

10 Claims, 4 Drawing Sheets

US 7,922,231 B2

FUEL DOOR LOCKING SYSTEM

TECHNICAL FIELD

The present invention relates to fuel doors utilized for motor vehicle applications, and more particularly to a slidably interfaced fuel door and goose neck hinge combination. Still more particularly, the present invention relates to a locking system which prevents unauthorized sliding removal of a fuel door from its goose neck hinge.

BACKGROUND OF THE INVENTION

Access to the fuel fill cap of a motor vehicle is cosmetically and environmentally hidden by a hinged fuel door. The fuel door when closed is generally in parallel relation to a surrounding fender or other body panel, and when open is hinged at generally ninety degrees to the body panel and disposed off-set at one side of the filler cap opening in the body panel so as to provide easy and ample access to the filler cap. In order for the fuel door to be hinged with the proper movement from the closed state to the open state and then back again, a hinge is provided which is attached to a body component behind the body panel, and a hinge arm is provided to which the fuel door is attached. The hinge arm has a curvaceous shape to provide the desired generally ninety degree pivoting and off-set displacement of the fuel door, being customarily referred to as a "goose neck" hinge arm.

An innovation for fuel doors and their goose neck hinge arms that has been recently implemented in motor vehicle applications is a slidable interface between the goose neck hinge arm base and the fuel door which allows for ready replacement of the fuel door for purposes, for example, of damage repair or cosmetic customization.

FIGS. 1A and 1B depict an example of a prior art slidably interfaced fuel door and goose neck hinge arm combination 10. The goose neck hinge arm 12 is shown in the open state, wherein the fuel cap 14 is fully accessible in that the fuel door 16 is oriented at generally ninety degrees with respect to a surrounding body panel 18 and also displaced off-set to one side of the filler opening 20 by virtue of the curvaceous shape of the goose neck hinge arm 12. In this regard, the goose neck hinge arm 12 includes a goose neck hinge arm base 22. The inside surface 16a of the fuel door 16 has an opposing pair of ribs 24 which carry a plurality of alignment tabs 26 for slidingly interfacing with opposed edges 22a of the goose neck hinge arm base 22. The goose neck hinge arm base 22 has a resilient locking tab 28 which resiliently receives a locking boss 30 of the fuel door 16, wherein an interfering fit therebetween is provided when the fuel door is fully slid (along arrow Ar) into its operational position on the goose neck hinge arm base such that the fuel door is retained on the goose neck hinge arm base. As shown at FIG. 1B, a screw driver 32 (or other suitable tool) is used to lift the locking tab 28 out of interference with the locking boss 30, whereby the fuel door 16 may be slid off from the goose neck hinge arm base 22.

While the goose neck hinge arm base and fuel door combination of the prior art is an excellent innovation which has advanced the art, there remains the problem that the fuel door may be unauthorizedly slid off from its goose neck hinge arm base, which situation is most likely to happen in those applications in which the owner has installed a relatively expensive, cosmetically appealing fuel door, such as a chrome fuel door.

Accordingly, what remains needed in the art is some way to prevent unauthorized removal of a fuel door from its goose neck hinge arm base.

SUMMARY OF THE INVENTION

The present invention is a goose neck hinge arm and fuel door combination which includes a fuel door locking system in which the fuel door is prevented from being unauthorizedly slid off from its respective goose neck hinge arm base.

Considerations for providing a fuel door locking system include minimal cost and tamper resistance. While one-way drive heads and specialty tool drive heads of threaded fasteners are well known, these are expensive components and can be tampered with even in absence of the specialty drive tool, in that the very presence of the drive head lends itself to tampering, as for example by being gripped by pliers.

With these considerations in mind, the fuel door locking system according to the present invention utilizes, in its preferred exemplar embodiment, a locking pin, a pin aperture in a rib of the fuel door and a pin abutment of the goose neck arm base adjacent the pin aperture, wherein when the fuel door is slid into its operative position on the goose neck hinge arm base and the locking pin is inserted into the pin aperture, the locking pin has an interference relationship with the pin abutment such that the interference prevents the fuel door from being slid off from the goose neck hinge arm base. In this regard, the locking pin is structured to have an interfering relationship with respect thereto which impedes the locking pin from being removed from the pin aperture, preferably via a high frictional, interference fit with respect to the rib wall of the pin aperture and has an absence of a drive head onto which a tool could otherwise extract the locking pin, such that since tampering therewith is extremely difficult, and would-be thieves of the fuel door are thwarted.

Accordingly, it is an object of the present invention to provide a fuel door locking system which prohibits would be thieves from unauthorizedly sliding a fuel door off from its respective goose neck hinge arm base.

This and additional objects, features and advantages of the present invention will become clearer from the following specification of a preferred embodiment.

DESCRIPTION OF THE PREFERRED EMBODIMENT

Figure 1A:
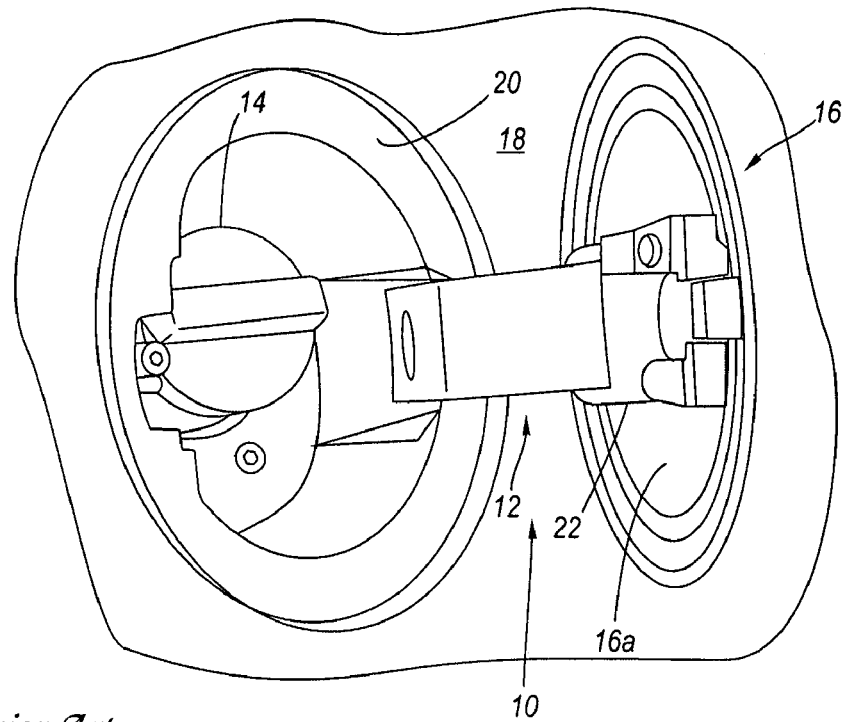
FIG. 1A is a perspective view of a motor vehicle body panel, showing the filler cap opening thereof, filler cap, and a prior art goose neck hinge arm and fuel door combination in which the fuel door has been slidingly mounted to the goose neck hinge arm base.

Referring now to the Drawing, FIGS. 2A through 3D depict an example of a fuel door locking system 100 according to the present invention which is applicable to goose neck hinge arm and fuel door combinations in which the fuel door is slidably interfaced with a base of the goose neck hinge arm.

The primary intention of the present invention is theft deterrence of expensive, customized fuel doors. As mentioned hereinabove, considerations for providing a fuel door locking system include minimal cost and tamper resistance, and while one-way drive heads and specialty tool drive heads of threaded fasteners are well known, these are expensive components and can be tampered with in that their drive heads lend them to being prone to manipulation by a thief, even one not having the appropriate drive tool, but rather having an inappropriate tool, such as a pliers, to extract the threaded fastener by gripping upon the drive head. Accordingly, it is with these considerations in mind, that the fuel door locking system 100 according to the present invention has been devised, wherein a tamper-proof interference fit is provided as between the fuel door and the goose neck hinge base, and which is free of a drive head, such that a would-be thief is thwarted in his/her nefarious machinations, no matter the tools of choice.

Turning attention now to FIGS. 2A through 3D, an example of the structure and function of a preferred fuel door locking system 100 is depicted, it being understood that upon a review of this disclosure, an artisan could devise other structures to do essentially the same function, all of which being considered within the scope of the appended claims.

Figure 1B:
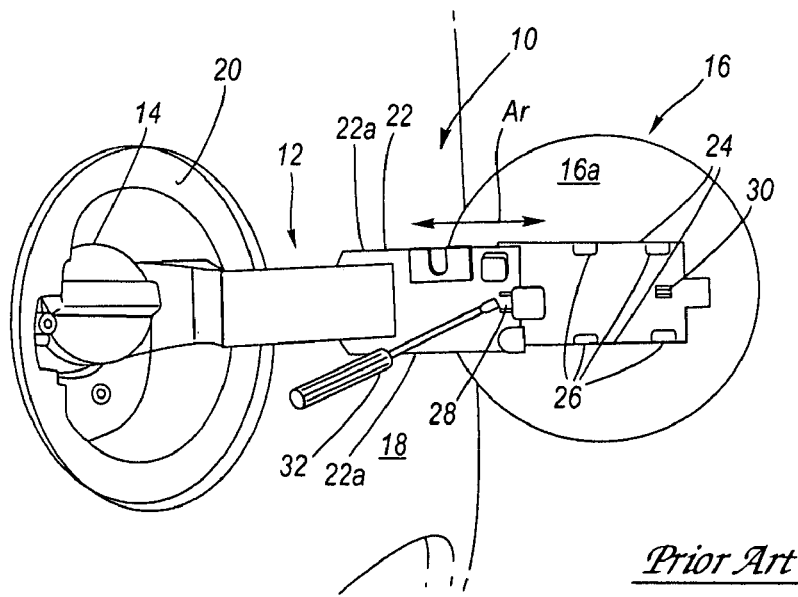
FIG. 1B is a perspective view similar to FIG. 1A, wherein now the prior art goose neck hinge arm and fuel cap combination is being modified by the fuel cap being slid off/onto the goose neck hinge arm base.

By way of exemplification, a goose neck hinge arm 102 has a goose neck hinge arm base 104 which, by way of example, is generally similar to that shown and depicted with respect to FIGS. 1A and 1B, wherein the fuel door 106 is slidably interfaced with the goose neck hinge arm base, and wherein the goose neck hinge arm is in the open state (as generally per FIG. 1B) during which the fuel door is installed upon the goose neck hinge arm base.

Figure 2A:
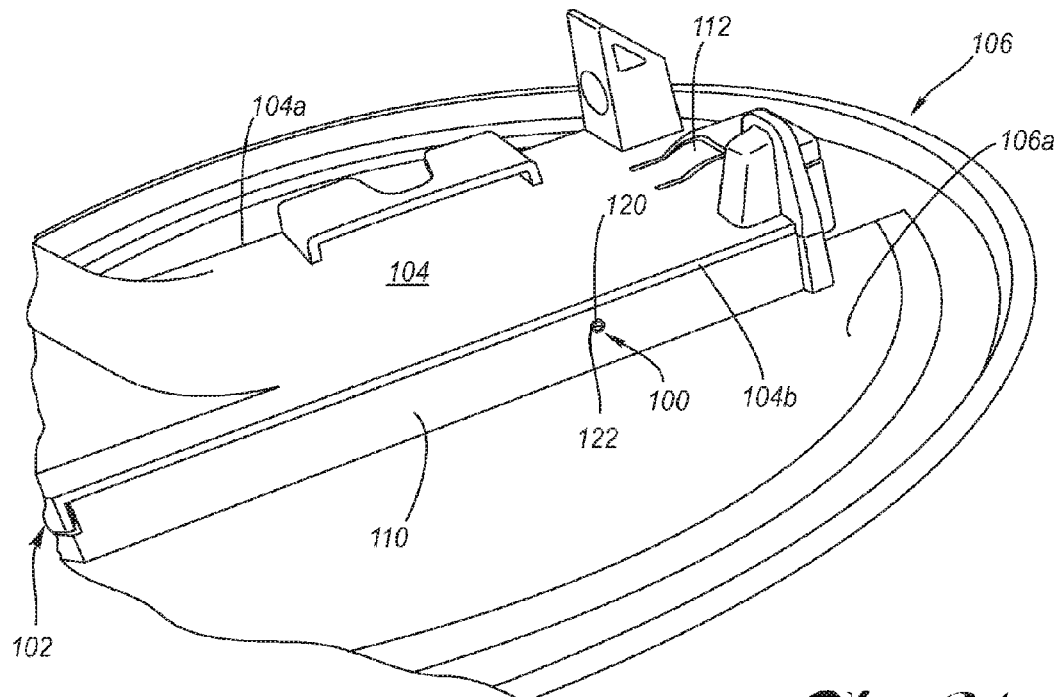
FIG. 2A is a detail perspective view of a goose neck hinge arm base and the inside surface of a fuel door, showing the pin aperture of the fuel door with the lock pin inserted therein according to the present invention.
Figure 2B:
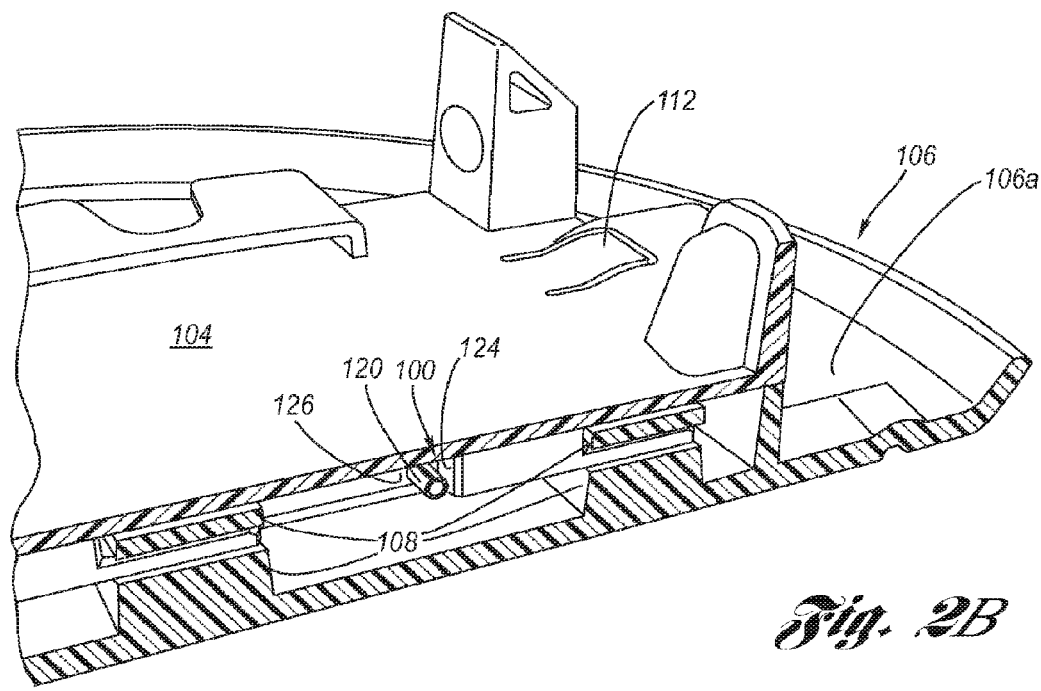
FIG. 2B is a partly sectional, detail perspective view of a goose neck base and the inside surface of a fuel door, as depicted at FIG. 2A, showing the locking pin fully seated into the pin aperture.
Figure 3A:
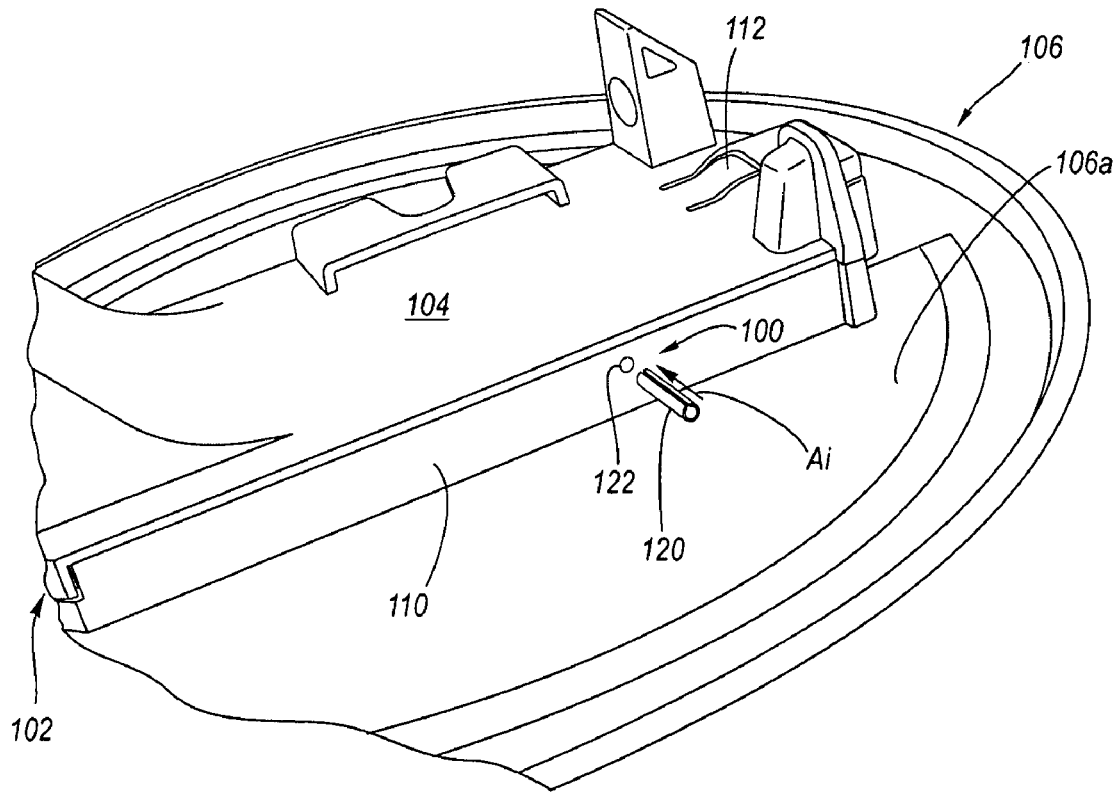
FIG. 3A is a detail perspective view of a goose neck hinge arm base and the inside surface of a fuel door according to the present invention, wherein the locking pin is positioned for being inserted into the pin aperture of the fuel door.

In this regard at FIGS. 2A, 2B and 3A, the fuel door 106 has been conventionally slid onto the goose neck hinge arm base 104, whereby the plurality of alignment tabs 108 at the pair of opposed ribs 110 (one rib being visible in FIGS. 2A and 3A) of the inside surface 106a of the fuel door 106 have slidingly interfaced with the opposed edges 104a of the goose neck hinge arm base 104. Further, the resilient locking tab 112 of the goose neck hinge arm base 104 has, as is conventional per FIGS. 1A and 1B, springingly (resiliently) seated with respect to the locking boss (not visible in FIGS. 2A and 3A), but visible as locking boss 30 in FIG. 1B) of the fuel door 106 with an interfering fit therebetween, whereby the fuel door has been fully slid into its operational position on the goose neck hinge arm base.

The fuel door locking system 100 according to the present invention utilizes, in a preferred exemplar embodiment depicted at FIGS. 2A through 3D, a locking pin 120, a pin aperture 122 in a rib 110 of the fuel door 106 and a primary pin abutment 124 of the goose neck hinge arm base 104 adjacent the pin aperture and disposed in generally parallel relation to the locking pin. Preferably, a secondary abutment 126 of the goose neck hinge arm base 104 is generally oriented perpendicular to the primary abutment 124 and is located superposed the pin aperture 122, so as to serve as a location feature for the locking pin 120, providing a positive travel limit during insertion of the locking pin into the pin aperture such that when the locking pin is fully inserted into the pin aperture and one (first) end of the locking pin abuts the secondary abutment, the opposite (second) end of the locking pin is disposed in the pin aperture in generally flush relation with respect to the rib 110 of the fuel door, as generally shown at FIGS. 2A through 2C.

Referring now particularly to FIGS. 3A through 3D, the structural features and operation of the fuel door locking system 100 will be further detailed.

Figure 3B:
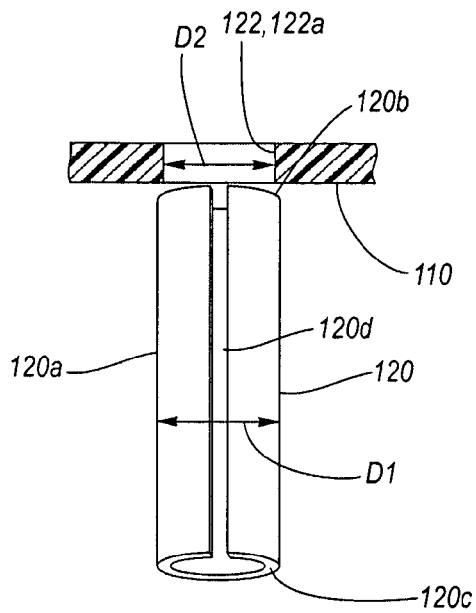
FIGS. 3B through 3D are each a partly sectional detail, top view of the lock pin and pin aperture according to the present invention, the views showing progressive stages of the insertion of the lock pin into the pin aperture.
Figure 3C:
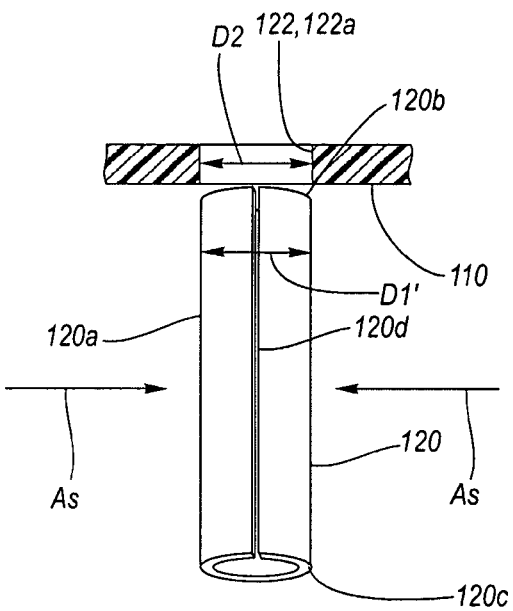
Figure 3D:
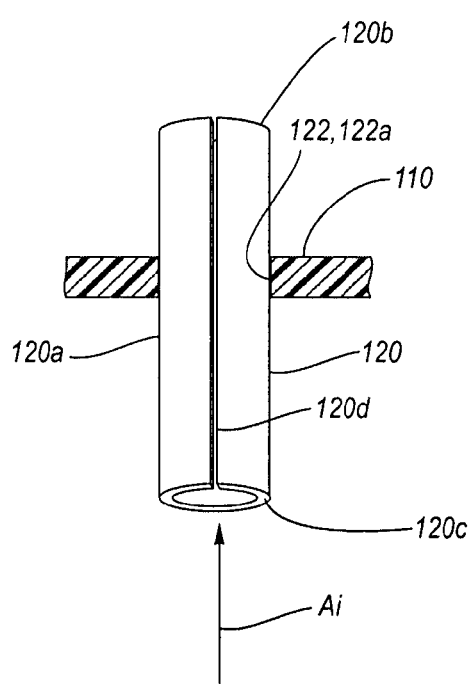

The locking pin 102 is preferably in the form of a hollow cylinder wall 120a having first and second ends 120b, 120c and a longitudinal slot 120d. The material of the cylinder wall 120a may be composed of any hard, durable and resilient material, as for example metal or plastic. In this regard, the locking pin 120 has an outside diameter D1 which is wider than the diameter D2 of the pin aperture 122, as shown at FIG. 3B. Accordingly, in order for the locking pin 102 to be insertable into the pin aperture 122, it is first necessary for the locking pin cylinder wall 120a to be squeezed such that its outside diameter D1' is not more than the diameter D2 of the pin aperture such that the locking pin is insertable into the pin aperture, as shown at FIGS. 3C and 3D. As can be understood by comparison between FIGS. 3B and 3C, squeezing (along arrows As) of the cylinder wall 120a involves the slot 120d being reduced in width, whereby the outside diameter goes from D1 to D1', wherein the outside diameter D1' is approximately equal to the diameter D2 of the pin aperture 122.

Figure 2C:
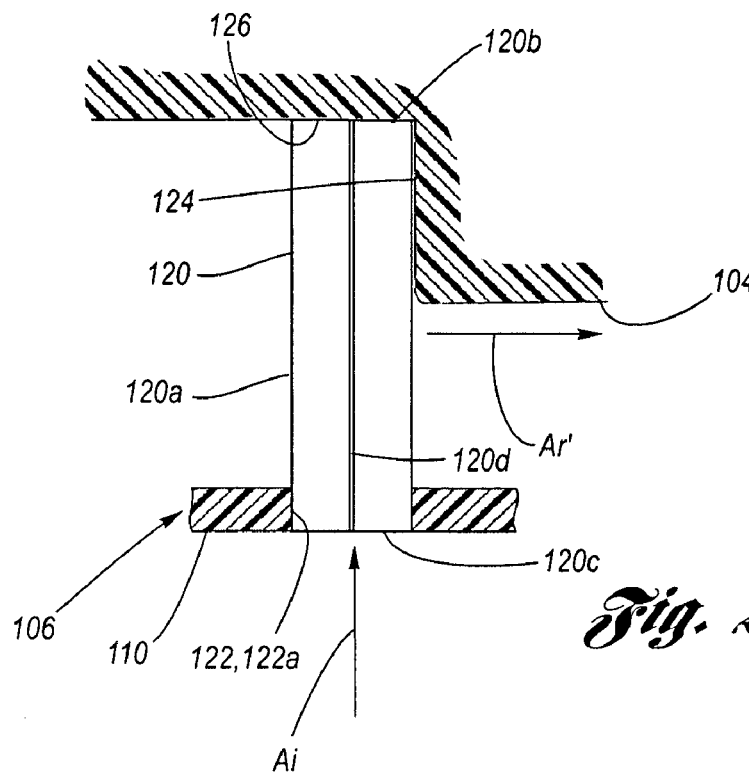
FIG. 2C is a partly sectional detail, top view of the lock pin, pin aperture, and primary and secondary pin abutments of FIG. 2B.

The locking pin 120 is then inserted (along arrow Ai) into the pin aperture 122 until the first end 120b thereof abuts the secondary abutment 126, whereupon the second end 120c of the locking pin is flush with the rib 110, as generally depicted at FIG. 2C. The locking pin 120 abuts the primary abutment 124, and the resiliency of the cylinder wall 120a causes a tight frictional interaction with the aperture wall 122a of the pin aperture 122 (wherein now the cylinder wall 120a resiliently presses upon the rib wall) such that the locking pin is tightly wedged in the pin aperture. In this disposition of the locking pin 120 and its abutment with respect to the primary abutment 124, the fuel door cannot be slid (see FIG. 2C and arrow Ar') off from the goose neck hinge arm base 104.

Now, in the event a would-be thief should covetingly eye the fuel door to the point of intent to commit theft, this would-be thief will first be required to overcome the fuel door locking system 100, whereby even if the locking tab 112 has been conventionally released from the locking boss, not visible in FIGS. 2A and 3A, but visible as locking boss 30 in FIG. 1B, the fuel door 106 will still not be slidable off the goose neck hinge arm base 104 because of the interfering abutment of the locking pin 120 with respect to the primary abutment 124.

On one hand, for example, if the would-be thief attempts to use a thin rod (i.e., a nail, etc.) pounded by a hammer (or other "tool" that can deliver blows to the rod) in order to punch the locking pin 120 into the pin aperture 122 in an attempt to destroy the interfering abutment relationship of the locking pin with respect to the primary abutment 124, this attempt will be doomed to failure because of the abutment of the first end 120b of the locking pin with respect to the secondary abutment 126 which will resist any attempt to move the locking pin inwardly out of the pin aperture.

On the other hand, for further example, if the would-be thief tries to extract the locking pin 120 outwardly from the pin aperture 122, the absence of a head, flushness of the second end 120c, and the tight frictional interaction as between the locking pin cylinder wall 120a and the rib wall 122a of the pin aperture will all serve to preclude the would-be thief from successfully gripping the locking pin in a vain attempt to pull it out of the pin aperture.

Indeed, unless the would-be thief is carrying a portable drill to drill-out the locking pin, the fuel door is safe from being stolen.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. In a fuel door and hinge arm combination, wherein the fuel door of said combination is slidably interfaced with respect to the hinge arm, and wherein said fuel door is releasably held in position relative to said hinge arm by a resilient locking tab; an improvement thereto comprises a fuel door locking system comprising:
   said fuel door having a pin aperture;
   an abutment of said hinge arm disposed adjacent said pin aperture; and
   a locking pin adapted for being inserted into said pin aperture with an interfering relationship with respect thereto which impedes said locking pin from being removed from said pin aperture;
   wherein when said fuel door is slidably interfaced on said hinge arm such that said fuel door is releasably held in position relative to said hinge arm by said resilient locking tab, and further when said locking pin is inserted into said pin aperture, then said abutment interferingly abuts said locking pin to prevent said fuel door from being slid off from said hinge arm irrespective of said resilient locking tab.

2. The improved combination of claim 1, wherein said abutment is a primary abutment; said improvement further comprising:
   a secondary abutment of said hinge arm superposed said pin aperture;
   wherein when said locking pin is fully inserted into said pin aperture, said secondary abutment abuts an end of the locking pin and the other end of the locking pin is generally flush with a portion of said fuel door adjoining said pin aperture.

3. The improved combination of claim 2, wherein said locking pin comprises:
   a resilient cylinder wall having a longitudinal slot formed therein;
   wherein said cylinder wall has a first outside diameter which is larger than a diameter of said pin aperture; and
   wherein a width of said slot of said cylinder wall is reduced to provide a second outside diameter of said cylinder wall which is substantially equal to said diameter of said pin aperture when said locking pin is inserted into said pin aperture.

4. The improved combination of claim 3, wherein said cylinder wall is free of a drive head.

5. A fuel door, hinge arm and locking system, comprising:
   a fuel door;
   a hinge arm;
   a sliding interface of said fuel door and said hinge arm, wherein said fuel door is slidably interfaced with respect to the hinge arm;
   a resilient locking tab releasable holding said fuel door in said sliding interfaced position with respect to said hinge arm; and a fuel door locking system comprising:
   said fuel door having a pin aperture;
   an abutment of said hinge arm disposed adjacent said pin aperture; and
   a locking pin adapted for being inserted into said pin aperture with an interfering relationship with respect thereto which impedes said locking pin from being removed from said pin aperture;
   wherein when said fuel door is slidably interfaced on said hinge arm such that said fuel door is releasably held in position relative to said hinge arm by said resilient locking tab, and further when said locking pin is inserted into said pin aperture, then said abutment interferingly abuts said locking pin to prevent said fuel door from being slid off from said hinge arm irrespective of said resilient locking tab.

6. The fuel door, hinge arm and locking system of claim 5, wherein said abutment is a primary abutment; further comprising:
   a rib being connected with an inside surface of said fuel door, wherein said pin aperture is formed in said rib;
   a secondary abutment of said hinge arm superposed said pin aperture;
   wherein when said locking pin is fully inserted into said pin aperture, said secondary abutment abuts an end of the locking pin and the other end of the locking pin is generally flush with said rib.

7. The fuel door, hinge arm and locking system of claim 6, wherein said locking pin comprises:
   a resilient cylinder wall free of a drive head, said cylinder wall having a longitudinal slot formed therein;
   wherein said cylinder wall has a first outside diameter which is larger than a diameter of said pin aperture; and
   wherein a width of said slot of said cylinder wall is reduced to provide a second outside diameter of said cylinder wall which is substantially equal to said diameter of said pin aperture when said locking pin is inserted into said pin aperture.

8. A method for locking a fuel door to a hinge arm, comprising the steps of:
   sliding a fuel door onto a hinge arm;
   holding the fuel door in sliding relation on the hinge arm by selectively releasable operation of a resilient locking tab;
   inserting a locking pin into a pin aperture of the fuel door;
   establishing an interference relationship between the locking pin and the pin aperture which impedes the locking pin from being removed from the pin aperture; and
   abuttingly interfering the hinge arm with respect to the inserted locking pin such that the fuel door is prevented from being slid off the hinge arm by the abutting interference irrespective of the selectively releasable operation of the resilient locking tab.

9. The method of claim 8, further comprising:
   abuttingly interfering the hinge arm with respect to the inserted locking pin such that the locking pin is located with respect to the pin aperture so as to be prevented from being inserted, during said step of inserting, entirely through the pin aperture.

10. The method of claim 9, wherein said step of establishing comprises:
    squeezing said locking pin to a small diameter thereof which is substantially equal to a diameter of said pin aperture;
    wherein when said step of squeezing is terminated, the locking pin resiliently presses upon an aperture wall which defines the pin aperture.

* * * * *